(12) United States Patent
Kim et al.

(10) Patent No.: US 6,917,513 B1
(45) Date of Patent: Jul. 12, 2005

(54) NON REDUCIBLE DIELECTRIC CERAMIC COMPOSITION AND SUPER-THIN MULTI-LAYER CERAMIC CAPACITOR USING THE SAME

(75) Inventors: Woo Sup Kim, Kyungki-do (KR); Chan Kong Kim, Kyungki-do (KR); Kang Heon Hur, Kyungki-do (KR); Jong Han Kim, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 0 days.

(21) Appl. No.: 10/884,952

(22) Filed: Jul. 7, 2004

(30) Foreign Application Priority Data

Apr. 14, 2004 (KR) ................................. 10-2004-0025593

(51) Int. Cl.$^7$ ................................................ H01G 4/06
(52) U.S. Cl. ............................... 361/321.2; 361/321.4; 361/321.5; 501/139; 501/138
(58) Field of Search ................................ 361/311, 312, 361/313; 501/137–139

(56) References Cited

U.S. PATENT DOCUMENTS 5,397,753 A * 3/1995 Nishiyama et al. ......... 501/138
6,185,087 B1 * 2/2001 Park et al. ............... 361/321.4
6,777,363 B2 * 8/2004 Park et al. .................. 501/139

FOREIGN PATENT DOCUMENTS

JP 2000-311828 11/2000

* cited by examiner

*Primary Examiner*—Anthony Dinkins
(74) *Attorney, Agent, or Firm*—Lowe Hauptman & Berner, LLP

(57) ABSTRACT

The non reducible dielectric ceramic composition comprising a main component of $(Ba_{1-x}Ca_x)_m(Ti_{1-y}Zr_y)O_3$, subcomponents of MgO, $Re_2O_3$, MO, MnO and $V_2O_5$ where Re is one or more elements selected from the group of Y, Dy and Ho and M is one or two elements selected from the group of Ba and Ca, and a sintering aid of $SiO_2$, wherein when the composition is represented by the formula $100(Ba_{1-x}Ca_x)_m(Ti_{1-y}Zr_y)O_3+bMgO+cRe_2O_3+dMO+eMnO+fV_2O_5+gSiO_2$, the ratio of the components satisfies the conditions of $0.005 \leq x \leq 0.15$, $0.995 \leq m \leq 1.03$, $0.0005 \leq y \leq 0.005$, $0.1 \leq b \leq 3.0$, $0.1 \leq c \leq 3.0$, $0.05 \leq d \leq 2.0$, $0.05 \leq e \leq 50.3$, $0.0 \leq f \leq 0.1$, and $0.2 \leq g \leq 3.0$ based on the molar ratio.

23 Claims, 2 Drawing Sheets

NON REDUCIBLE DIELECTRIC CERAMIC COMPOSITION AND SUPER-THIN MULTI-LAYER CERAMIC CAPACITOR USING THE SAME

RELATED APPLICATIONS

The present application is based on, and claims priority from, Republic of Korea Application Serial Number 2004-25593, filed Apr. 14, 2004, the disclosure of which is hereby incorporated by reference herein in its entirety.

BACKGROUND OF THE INVENTION

1. Field of the Invention

The present invention relates to a dielectric ceramic composition for a multi-layer ceramic capacitor, of which temperature coefficient of capacitance (TCC) characteristics satisfy X5R characteristics (−55° C.~85° C., ±15%) of the Electronic Industrial Association (EIA) standard. More particularly, the present invention relates to a non reducible dielectric ceramic composition of a high dielectric constant, which can be sintered at a lower temperature and restricted in grain growth, enabling a super thin multi-layer ceramic capacitor, and to a multi-layer ceramic capacitor using the same.

2. Description of the Related Art

With recent advances in development of the electric and electronic industries, high integration, miniaturization and weight reduction of electronic components have been rapidly progressed. As for a ceramic capacitor, in addition to securing an excellent heat resistance and a good reliability, there has also been strong demand for increase in capacitance and reduction in size thereof.

According to the temperature coefficient of capacitance (TCC) based on the EIA standard, the multi-layer ceramic capacitors can be classified into Y5V products (($\Delta C/C$)×100=−82~+22%) at a temperature of −50~85° C.), X5R products (($\Delta C/C$)×100=±15% at a temperature of −55~85° C.) and X7R products (($\Delta C/C$)×100=±15% at a temperature of −55~125° C.). When further reducing the thickness of a dielectric layer to 3 $\mu$m or less, a product having X5R characteristics is generally used.

Meanwhile, as for internal electrodes, although a noble metal, such as Pd or Pd alloys, has generally been used, a base metal, such as Ni or Ni alloys, is put into practical use due to its relatively low price. However, when using the base metal, such as Ni or Ni alloys, for the internal electrodes, there is a problem in that the electrodes are oxidized in a sintering process. Thus, the sintering must be performed under a reducing atmosphere. When sintering under the reducing atmosphere, the dielectric layers are reduced to have a lower insulation resistance (IR). Thus, there has been developed a reduction resistant dielectric material, which is not reduced under the reducing atmosphere.

A non reducible dielectric ceramic composition for the multi-layer ceramic capacitor, which uses the base metal for the internal electrodes, is set forth in Japanese Patent Laid-open Publication No.2000-311828. The dielectric ceramic composition of the invention has a TCC satisfying X7R characteristics of the EIA standard. The dielectric ceramic composition comprises: 100 moles of $BaTiO_3$; 0.1~3 moles of at least one element selected from MgO, CaO, BaO, SrO and $Cr_2O_3$; 2~12 moles of $(Ba, Ca)_xSiO_{2+x}$ (where x=0.8~1.2); 0.1~3 moles of at least one element selected from $V_2O_5$, $MoO_3$ and $WO_3$; and 0.1~10 moles of an R oxide (where R is at least one element selected from Y, Dy, Tb, Gd and Ho).

A multi-layer ceramic capacitor using the dielectric ceramic composition disclosed in Japanese Patent Laid-open Publication No.2000-311828 has an advantage in that variation rate of the capacitance with the passage of time and reduction in the capacitance under a DC electric field are low. However, this dielectric ceramic composition should be sintered at a high temperature of 1270° C. or more. Further, when the dielectric layers of the dielectric ceramic composition are laminated into four layers, each of which has a thickness of 3 $\mu$m, the multi-layer ceramic capacitor has a dielectric constant of 3,085 or less. Thus, the dielectric layer in the multi-layer ceramic capacitor of the invention cannot be reduced in thickness to 2 $\mu$m level and the dielectric constant of the multi-layer ceramic capacitor is also low.

When a sintering temperature is higher than 1200° C., the internal electrodes made of the base metal, such as Ni, shrink earlier than the dielectric layers, so that delamination can easily occur between the layers. Further, the internal electrodes can be easily massed into balls, thereby providing a high possibility of short circuit, and when the dielectric layers are made thinner and thinner, the possibility of the short circuit further increases.

Further, when making thinner dielectric layers, a higher voltage is applied to the dielectric material in a greater quantity, thereby causing reduction in dielectric constant, deterioration in variation rate of the capacitance depending on the temperature, and increase in variation rate of the capacitance by the DC bias. Additionally, when the dielectric layers, each of which has a thickness of 3 $\mu$m or less, are made to thinner layers, the number of dielectric particles between the internal electrodes is reduced, making it difficult to ensure stable electrical properties. Thus, there is a need to provide a dielectric ceramic composition, which can be inhibited grain growth of the composition as the thickness of the dielectric layer is reduced. With regard to this, when a higher dielectric constant is achieved for the same particle size, it is more advantageous to make the thinner layers.

The multi-layer ceramic capacitor satisfying the X5R characteristics is required to have the dielectric ceramic composition, which can be sintered at a low temperature of 1200° C. or less, inhibited the grain growth for allowing the super thin layer to be attained, and which can realize in characteristics of a high dielectric constant.

SUMMARY OF THE INVENTION

The present invention has been made to solve the above problems, and it is an object of the present invention to provide a non reducible dielectric ceramic composition having a high dielectric constant, which can be sintered at a lower temperature and inhibited grain growth, so that dielectric layers in a multi-layer ceramic capacitor can be made into super thin layers, each of which has a thickness of 3 $\mu$m or less.

It is another object of the present invention to provide a multi-layer ceramic capacitor, which satisfies X5R characteristics and is laminated with the dielectric layers, each of which has a thickness of 3 $\mu$m or less, so that electrical properties and an average life span thereof can be remarkably enhanced.

In accordance with an aspect of the present invention, the above and other objects can be accomplished by the provision of a dielectric ceramic composition comprising: a main component of $(Ba_{1-x}Ca_x)_m(Ti_{1-y}Zr_y)O_3$; subcomponents of MgO, $Re_2O_3$, MO, MnO and $V_2O_5$ where Re is one or more elements selected from the group of Y, Dy and Ho and where M is one or two elements selected from the group of Ba and Ca; and a sintering aid of $SiO_2$, wherein when the composition is represented by the formula $100(Ba_{1-x}Ca_x)_m(Ti_{1-y}Zr_y)O_3+bMgO+cRe_2O_3+dMO+eMnO+fV_2O_5+gSiO_2$, the ratio of the components satisfies the conditions of $0.005 \leq x \leq 0.15$, $0.995 \leq m \leq 1.03$, $0.0005 \leq y \leq 0.005$, $0.1 \leq b \leq 3.0$, $0.1 \leq c \leq 3.0$, $0.05 \leq d \leq 2.0$, $0.05 \leq e \leq 0.3$, $0.0 \leq f \leq 0.1$, and $0.2 \leq g \leq 3.0$ based on the molar ratio.

In accordance with another aspect of the present invention, there is provided a dielectric ceramic composition comprising: a main component of $(Ba_{1-x}Ca_x)_m(Ti_{1-y}Sn_y)O_3$; subcomponents of MgO, $Re_2O_3$, MO, MnO and $V_2O_5$ where Re is one or more elements selected from the group of Y, Dy and Ho, and where M is one or two elements selected from the group of Ba and Ca; and a sintering aid of $gSiO_2$, wherein when the composition is represented by the formula $100(Ba_{1-x}Ca_x)_m(Ti_{1-y}Sn_y)O_3+bMgO+cRe_2O_3+dMO+eMnO+fV_2O_5+gSiO_2$, the ratio of the components satisfies the conditions of $0.005 \leq x \leq 0.15$, $0.995 \leq m \leq 1.03$, $0.0005 \leq y \leq 0.005$, $0.1 \leq b \leq 3.0$, $0.1 \leq c \leq 3.0$, $0.05 \leq d \leq 2.0$, $0.05 \leq e \leq 0.3$, $0.0 \leq f \leq 0.1$, and $0.2 \leq g \leq 3.0$ based on the molar ratio.

In accordance with another aspect of the present invention, there is provided a dielectric ceramic composition, comprising: a main component of $(Ba_{1-x}Ca_x)_mTiO_3$; subcomponents of MgO, $Re_2O_3$, MO, MnO and $V_2O_5$ where Re is one or more elements selected from the group of Y, Dy and Ho, and where M is one or two elements selected from the group of Ba and Ca; and a sintering aid of $(BaO—ZrO_2—SiO_2)$, wherein when the composition is represented by the formula $100(Ba_{1-x}Ca_x)_mTiO_3+bMgO+cRe_2O_3+dMO+eMnO+fV_2O_5+h(BaO—ZrC—SiO_2)$, the ratio of the components satisfies the conditions of $0.005 \leq x \leq 0.15$, $0.995 \leq m \leq 1.03$, $0.1 \leq b \leq 3.0$, $0.1 \leq c \leq 3.0$, $0.05 \leq d \leq 2.0$, $0.05 \leq e \leq 0.3$, $0.0 \leq f \leq 0.1$, and $0.3 \leq h \leq 4.1$ based on the molar ratio.

In accordance with another aspect of the present invention, there is provided a multi-layer ceramic capacitor, comprising a plurality of dielectric ceramic layers, internal electrodes formed between the dielectric ceramic layers and external electrodes electrically connected to the internal electrodes, each of the dielectric ceramic layers comprising: a main component of $(Ba_{1-x}Ca_x)_m(Ti_{1-y}Zr_y)O_3$; subcomponents of MgO, $Re_2O_3$, MO, MnO and $V_2O_5$ where Re is one or more elements selected from the group of Y, Dy and Ho, and where M is one or two elements selected from the group of Ba and Ca; and a sintering aid of $gSiO_2$, wherein when the composition is represented by the formula $100(Ba_{1-x}Ca_x)_m(Ti_{1-y}Zr_y)O_3+bMgO+cRe_2O_3+dMO+eMnO+fV_2O_5+gSiO_2$, the ratio of the components satisfies the conditions of $0.005 \leq x \leq 0.15$, $0.995 \leq m \leq 1.03$, $0.0005 \leq y \leq 0.005$, $0.1 \leq b \leq 3.0$, $0.1 \leq c \leq 3.0$, $0.05 \leq d \leq 2.0$, $0.05 \leq e \leq 0.3$, $0.0 \leq f \leq 0.1$, and $0.2 \leq g \leq 3.0$ based on the molar ratio.

In accordance with another aspect of the present invention, there is provided a multi-layer ceramic capacitor, comprising a plurality of dielectric ceramic layers, internal electrodes formed between the dielectric ceramic layers and external electrodes electrically connected to the internal electrodes, each of the dielectric ceramic layers comprising: a main component of $(Ba_{1-x}Ca_x)_m(Ti_{1-y}Sn_y)O_3$; subcomponents of MgO, $Re_2O_3$, MO, MnO and $V_2O_5$ where Re is one or more elements selected from the group of Y, Dy and Ho, and where M is one or two elements selected from the group of Ba and Ca; and a sintering aid of $gSiO_2$, wherein when the composition is represented by the formula $100(Ba_{1-x}Ca_x)_m(Ti_{1-y}Sn_y)O_3+bMgO+cRe_2O_3+dMO+eMnO+fV_2O_5+gSiO_2$, the ratio of the components satisfies the conditions of $0.005 \leq x \leq 0.15$, $0.995 \leq m \leq 1.03$, $0.0005 \leq y \leq 0.005$, $0.1 \leq b \leq 3.0$, $0.1 \leq c \leq 3.0$, $0.05 \leq d \leq 2.0$, $0.05 \leq e \leq 0.3$, $0.0 \leq f \leq 0.1$, and $0.2 \leq g \leq 3.0$ based on the molar ratio.

In accordance with yet another aspect of the present invention, there is provided a multi-layer ceramic capacitor, comprising a plurality of dielectric ceramic layers, internal electrodes formed between the dielectric ceramic layers and external electrodes electrically connected to the internal electrodes, each of the dielectric ceramic layers comprising: a main component of $(Ba_{1-x}Ca_x)_mTiO_3$; subcomponents of MgO, $Re_2O_3$, MO, MnO and $V_2O_5$ where Re is one or more elements selected from the group of Y, Dy and Ho, and where M is one or two elements selected from the group of Ba and Ca; and a sintering aid of $(BaO—ZrO_2—SiO_2)$, wherein when the composition is represented by the formula $100(Ba_{1-x}Ca_x)_mTiO_3+bMgO+cRe_2O_3+dMO+eMnO+fV_2O_5+h(BaO—ZrO_2—SiO_2)$, the ratio of the components satisfies the conditions of $0.005 \leq x \leq 0.15$, $0.995 \leq m \leq 1.03$, $0.1 \leq b \leq 3.0$, $0.1 \leq c \leq 3.0$, $0.05 \leq d \leq 2.0$, $0.05 \leq e \leq 0.3$, $0.0 \leq f \leq 0.1$, and $0.3 \leq h \leq 4.1$ based on the molar ratio.

BRIEF DESCRIPTION OF THE DRAWINGS

The above and other objects, features and other advantages of the present invention will be more clearly understood from the following detailed description taken in conjunction with the accompanying drawing.

DESCRIPTION OF THE PREFERRED EMBODIMENTS

Figure 1:
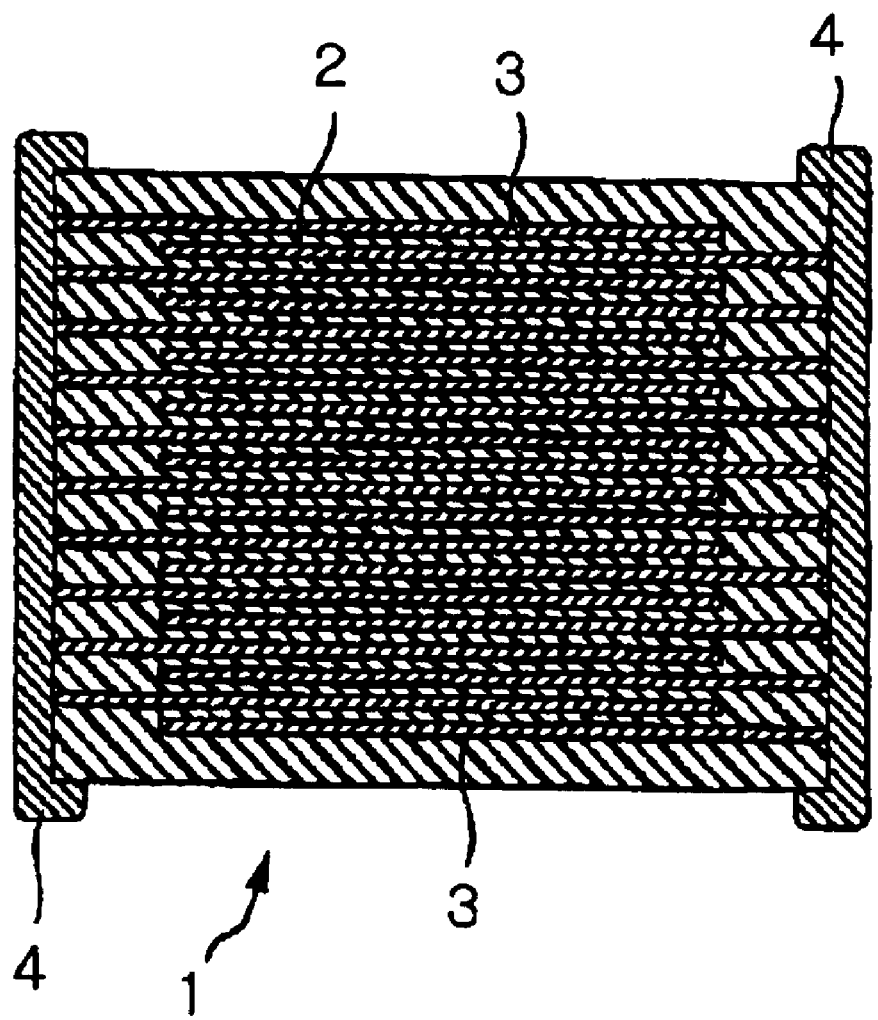
FIG. 1 is a diagram illustrating an example of a multi-layer ceramic capacitor.

The present invention will now be described in detail.

The inventors have developed the present invention, in consideration of the fact that if Ca is substituted for a part of Ba in a dielectric composition having a main component of $BaTiO_3$, and if Zr or Sn is added to the main component and/or a sintering aid while adding an adequate amount of subcomponents thereto, there can be obtained a dielectric composition with a high dielectric constant, which can be sintered at a lower temperature and inhibited grain growth, allowing super thin layers of the dielectrics. The dielectric ceramic composition of the present invention can be applied to a multi-layer ceramic capacitor of X5R characteristics ($\Delta C/C = \pm 15\%$ at $-55 \sim 85°$ C. based on the EIA standard), which requires super thin layers, each of which has a thickness of 3 $\mu$m or less.

The dielectric ceramic composition of the present invention can be classified according to an addition method of Zr or Sn. That is, when Zr or Sn is added to the main component, the main component of the dielectric ceramic composition is represented by the formula $(Ba_{1-x}Ca_x)_m(Ti_{1-y}N_y)O_3$ (N=Zr or Sn), whereas when Zr is added to the sintering aid, the main component of the dielectric ceramic composition is represented by the formula $(Ba_{1-x}Ca_x)_mTiO_3$.

[Dielectric Composition in Which Zr or Sn is Added to the Main Component]

When Zr or Sn is added to the main component, the dielectric composition may be represented by the formula $100(Ba_{1-x}Ca_x)_m(Ti_{1-y}N_y)O_3+bMgO+cRe_2O_3+dMO+eMnO+fV_2O_5+gSiO_2$.

In the formula, N in the main component is Zr or Sn, Re in the subcomponents is one or more elements selected from the group of Y, Dy and Ho, and M is one or two elements selected from the group of Ba and Ca.

[Main Component $(Ba_{1-x}Ca_x)_m(Ti_{1-y}N_y)O_3$ (N=Zr or Sn)]

In the main component of the present invention, Ca is substituted for a part of Ba in $BaTiO_3$ and forms oxygen vacancies, thereby imparting reduction resistance. Thus, there is provided an advantageous effect in that even if a core-shell structure is not formed or is thinly formed after sintering, the dielectric composition can exhibit a higher insulation resistance (IR). It is desirable that Ca be substituted in an amount of 0.005~0.15 moles (0.5 mol %~15 mol %). If Ca is substituted in an amount less than 0.005 moles, an average life time is shortened, whereas if Ca is substituted in an amount more than 0.15 moles, sintering properties are deteriorated and the dielectric constant is also decreased.

Further, Zr or Sn to be substituted in $(Ba_{1-x}Ca_x)_m(Ti_{1-y}N_y)O_3$ (N=Zr or Sn) is added in a small amount, so that it acts to shift the Curie Temperature to about 85° C. and is effective for realizing the X5R characteristics and enhancing the dielectric constant at room temperature. Preferably, the value of y, that is, the added amount of Zr or Sn is in the range of 0.0005 moles~0.005 moles (0.05~0.5 mol %). If the added amount of Zr or Sn is less than 0.0005 moles, the dielectric constant decreases, whereas if the added amount of Zr or Sn is more than 0.005 moles, DC bias characteristics are deteriorated and variation rate of capacitance with passage of time is increased.

Preferably, the value of m in $(Ba_{1-x}Ca_x)_m(Ti_{1-y}N_y)O_3$ (N=Zr or Sn) of the present invention is in the range of 0.995~1.03. If m is less than 0.995, specific resistance decreases, whereas if m is more than 1.03, the sintering properties and the insulation resistance (IR) are reduced.

Preferably, the main component of $(Ba_{1-x}Ca_x)_m(Ti_{1-y}N_y)O_3$ (N=Zr or Sn) has an average particle diameter of 50~400 nm. If the average particle diameter is more than 400 nm, the dielectric constant increases, while the average life time is shortened. If the average particle diameter is less than 50 nm, the dielectric constant is decreased.

[Subcomponent 0.1~3.0 Moles of MgO]

MgO provided as the subcomponent of the present invention acts to inhibit the grain growth of the main component. Preferably, MgO is added in an amount of 0.1~0.3 moles. If the added amount of MgO is less than 0.1 moles, stability in grain growth is deteriorated, so that the specific resistance is reduced and the electrostatic capacitance-temperature characteristics of the capacitor do not satisfy the X5R characteristics. If the added amount of MgO is more than 3.0 moles, the sintering temperature increases and the average life span is shortened. In addition to MgO, a material, which can be formed as an oxide after a heat treatment, can also be applied to the present invention. For instance, including MgO, a carbonate such as $MgCO_3$, an oxide and a $NO_3$-type nitrate can be applied.

[Subcomponent 0.1~3.0 Moles of $Re_2O_3$ (Re=Y, Dy or Ho)]

$Re_2O_3$ is one or more components selected from a rare earth metal group, such as $Y_2O_3$, $Dy_2O_3$ and $Ho_2O_3$, and acts to increase the average life time. If the rare earth component in the composition is less than 0.1 moles, the average life time at a high temperature is shortened. If the rare earth component in the composition is more than 3.0 moles, although the TCC characteristics are stabilized, the sintering properties are deteriorated, thus increasing the sintering temperature to 1,300° C. or more, thereby reducing the average life time. Among the rare earth compositions, $Y_2O_3$ is most preferred in view of its dielectric constant, TCC characteristics and average life time. If the added amount of $Y_2O_3$ is increased, the dielectric constant decreases slightly, while the average life span increases.

[Subcomponent 0.05~2.0 Moles MO (M=Ba or Ca)]

MO is one or more components selected from the group of BaO and CaO, and effectively inhibits the grain growth. As for MO, a material, which can be formed as an oxide of Ba or Ca after the heat treatment, can be applied to the present invention. As an example of MO, a carbonate, such as $BaCO_3$ or $CaCO_3$, or a nitrate, such as $NO_3$, etc., can be applied. Preferably, MO (M=Ba or Ca) is added in an amount of 0.05~2.0 moles. If the added amount of MO (M=Ba or Ca) is less than 0.05 moles, the grain growth is not effectively inhibited, whereas if the added amount of MgO is more than 2.0 moles, the sintering properties are reduced, thereby decreasing the insulation resistance.

In the present invention, the added amount of dMO (M=Ba or Ca) is preferably controlled depending on the value of m in $(Ba_{1-x}Ca_x)_m(Ti_{1-y}N_y)O_3$ (N=Zr or Sn). Most preferably, the sum of m and d (that is, the amount of Ba or Ca) is in the range of 1.00~1.03. If the sum of m and d is less than 1.00, the insulation resistance is low and the average life time is shortened, whereas if the sum of m and d is more than 1.03, the sintering properties are reduced, which has a negative influence on the average life time.

[Subcomponent 0.05~0.3 Moles of MnO]

The subcomponent MnO acts to enhance the IR properties of the main component at a high temperature and at room temperature in a reducing atmosphere. If MnO is added in an amount less than 0.05 moles, the insulation resistance is reduced, whereas if MgO is added in an amount more than 3.0 moles, the variation rate of the capacitance with the passage of time and with an application of the DC voltage increases.

[Subcomponent 0~0.1 Moles of $V_2O_5$]

It is desirable that $V_2O_5$ is added to the composition of the present invention. $V_2O_5$ does not significantly affect the dielectric constant, and provides effects of enhancing the sintering properties, the insulation resistance (IR) and the average life time. An adequate added amount of $V_2O_5$ is in the range of 0.1 moles or less. If the added amount of $V_2O_5$ is more than 0.1 moles, the insulation resistance (IR) properties are deteriorated.

[Sintering Aid 0.2~3.0 Moles of $SiO_2$]

As the sintering aid, an oxide comprising Si, which can lower the sintering temperature for the dielectric composition of the present invention, can be applied. Most preferably, the sintering aid comprises $SiO_2$. Preferably, $SiO_2$ is added in an amount of 0.2~3.0 moles. If the added amount of $SiO_2$ is less than 0.2 moles, the sintering properties are deteriorated, causing reduction in insulation resistance and in average life time. If the added amount of $SiO_2$ is more than 3.0 moles, both the dielectric constant and the insulation resistance are reduced. As for $SiO_2$, a fine powder of $SiO_2$ is preferred and it can be added as Si-sol or a Si-alkoxide compound.

[Dielectric Composition in Which Zr is Contained in the Sintering Aid]

When Zr is contained in the sintering aid, the dielectric composition comprises the main component of $(Ba_{1-x}Ca_x)_m(Ti_{1-y}Sn_y)O_3$, the subcomponents of $bMgO+cRe_2O_3+dMO+eMnO+fV_2O_5$, and the sintering aid of $h(BaO-ZrO_2-SiO_2)$. Here, among the subcomponents, Re is one or more elements selected from the group of Y, Dy and Ho, and M is one or more elements selected from the group of Ba and Ca.

[Main Component $(Ba_{1-x}Ca_x)_mTiO_3$]

In the main component of the present invention, Ca is substituted for a part of Ba in $BaTiO_3$ powder to form the oxygen vacancies, thereby imparting reduction resistance.

Thus, there is provided an advantageous effect in that even if the core-shell structure is not formed or is thinly formed after sintering, a higher IR can be exhibited. Preferably, Ca is substituted in an amount of 0.005~0.15 moles (0.5 mol %~15 mol %). If Ca is substituted in an amount less than 0.005 moles, the average life time is shortened, whereas if the amount is more than 0.15 moles, the sintering properties are deteriorated and the dielectric constant is decreased.

Preferably, the value of m in $(Ba_{1-x}Ca_x)_mTiO_3$ of the present invention is in the range of 0.995~1.03. If m is less than 0.995, the insulation resistance is reduced, whereas if m is more than 1.03, both the sintering properties and the insulation resistance are decreased.

Preferably, the main component of $(Ba_{1-x}Ca_x)_mTiO_3$ has an average particle diameter of 50~400 nm. If the average particle diameter is more than 400 nm, the dielectric constant increases, while the average life time is shortened. If the average particle diameter is less than 50 nm, the dielectric constant is decreased.

[Subcomponents]

As for the subcomponents of the present invention, 0.1~0.3 moles of MgO, 0.1~3.0 moles of $Re_2O_3$ (Re=Y, Dy or Ho), 0.05~2.0 moles of MO (M=Ba or Ca), 0.05~0.3 moles of MnO, and 0~0.1 moles of $V_2O_5$ are added. As the function of the components and the reason for restriction of their amounts are set forth in the above, the repetitious description will be omitted.

As described in the above, the added amount of dMO (M=Ba or Ca) is related to the value of m in $(Ba_{1-x}Ca_x)_mTiO_3$. Most preferably, the sum of m and d (that is, the amount of Ba or Ca) is in the range of 1.00~1.03. If the sum of m and d is less than 1.00, the specific resistance is low and the average life span is shortened, whereas if the sum of m and d is more than 1.03, the sintering properties are reduced, which has a negative influence on the average life time.

[Sintering Aid 0.3~4.1 Moles of $BaO-ZrO_2-SiO_2$]

In the present invention, instead of adding Zr to the main component, Zr may be added to the sintering aid. In such a sintering aid, $BaO-ZrO_2-SiO_2$ may be used. When adding Zr to the sintering aid, Zr also acts to shift the Curie Temperature to about 85° C. and to enhance the dielectric constant at room temperature. Further, the sintering temperature can be further reduced by 30~35° C. Reduction in sintering temperature can effectively reduce structural defects, such as the short circuit of electrodes, in the super thin dielectric layers.

The sintering aid preferably contains 5~15 mol % of $ZrO_2$, 50~75 mol % of $SiO_2$ and the remainder of BaO. If the amount of $ZrO_2$ is less than 5 mol %, the effects of improvement in TCC are not exhibited and it cannot be sintered at a low temperature. If the amount of $ZrO_2$ is more than 15 mol %, the DC bias characteristics are deteriorated. If the amount of $SiO_2$ is less than 50 mol %, the sintering properties are reduced, whereas if the amount of $SiO_2$ is more than 75 mol %, the IR properties are deteriorated.

Preferably, the added amount of the sintering aid ($BaO-ZrO_2-SiO_2$) is in the range of 0.3~4.1 moles. If the added amount of the sintering aid $BaO-ZrO_2-SiO_2$ is not in the range of 0.3~4.1 moles, both the insulation resistance and the average life time are decreased.

A multi-layer ceramic capacitor of the present invention will now be described.

A multi-layer ceramic capacitor 1 of the present invention comprises a plurality of dielectric ceramic layers 2, internal electrodes 3 formed between the dielectric ceramic layers 2 and external electrodes 4 electrically connected to the internal electrodes 3.

When Zr or Sn is added to the main component, the dielectric ceramic layers can be represented by the formula $100(Ba_{1-x}Ca_x)_m(Ti_{1-y}Zr_y)O_3+bMgO+cRe_2O_3+dMO+eMnO+fV_2O_5+gSiO_2$, where N in the main components is Zr or Sn, Re in the subcomponents is one or more elements selected from the group of Y, Dy and Ho, and M is one or two elements selected from the group of Ba and Ca.

When Zr or Sn is added to the sintering aid, the dielectric ceramic layer comprises: a main component of $(Ba_{1-x}Ca_x)_mTiO_3$; subcomponents of $bMgO+cRe_2O_3+dMO+eMnO+fV_2O_5$; and a sintering aid of $h(BaO-ZrO_2-SiO_2)$. Here, in the subcomponents, Re is one or more elements selected from the group of Y, Dy and Ho, and M is one or two elements selected from the group of Ba and Ca.

Since the description of the main component, the subcomponent and the sintering aid in the dielectric ceramic composition will be the same as the description of the dielectric ceramic composition as described above, it will be omitted.

The dielectric ceramic layers are manufactured from slurries comprising the main component, the subcomponents and the sintering aid. Each of the dielectric ceramic layers is provided as a super thin layer having a thickness of 0.5~3 μm and can ensure a dielectric constant of 3,500 or more. More preferably, the dielectric ceramic layer has a thickness of 0.5~2.5 μm. The dielectric ceramic layer can be laminated to 150 or more layers and ensure a high dielectric constant. As for the main component of the present invention, powder made by a solid synthesis method, powder made by a hydrothermal synthesis method, or powder made by a sol-gel method can be put into practical use. The dielectrics can be sintered to the ceramic layers in a reducing atmosphere, preferably at a low temperature of 1,200° C. or less, and more preferably at a low temperature of 1,150~1,200° C. As for the internal electrodes, a base metal, such as nickel, nickel alloy, copper or copper alloy, can be used.

Figure 2:
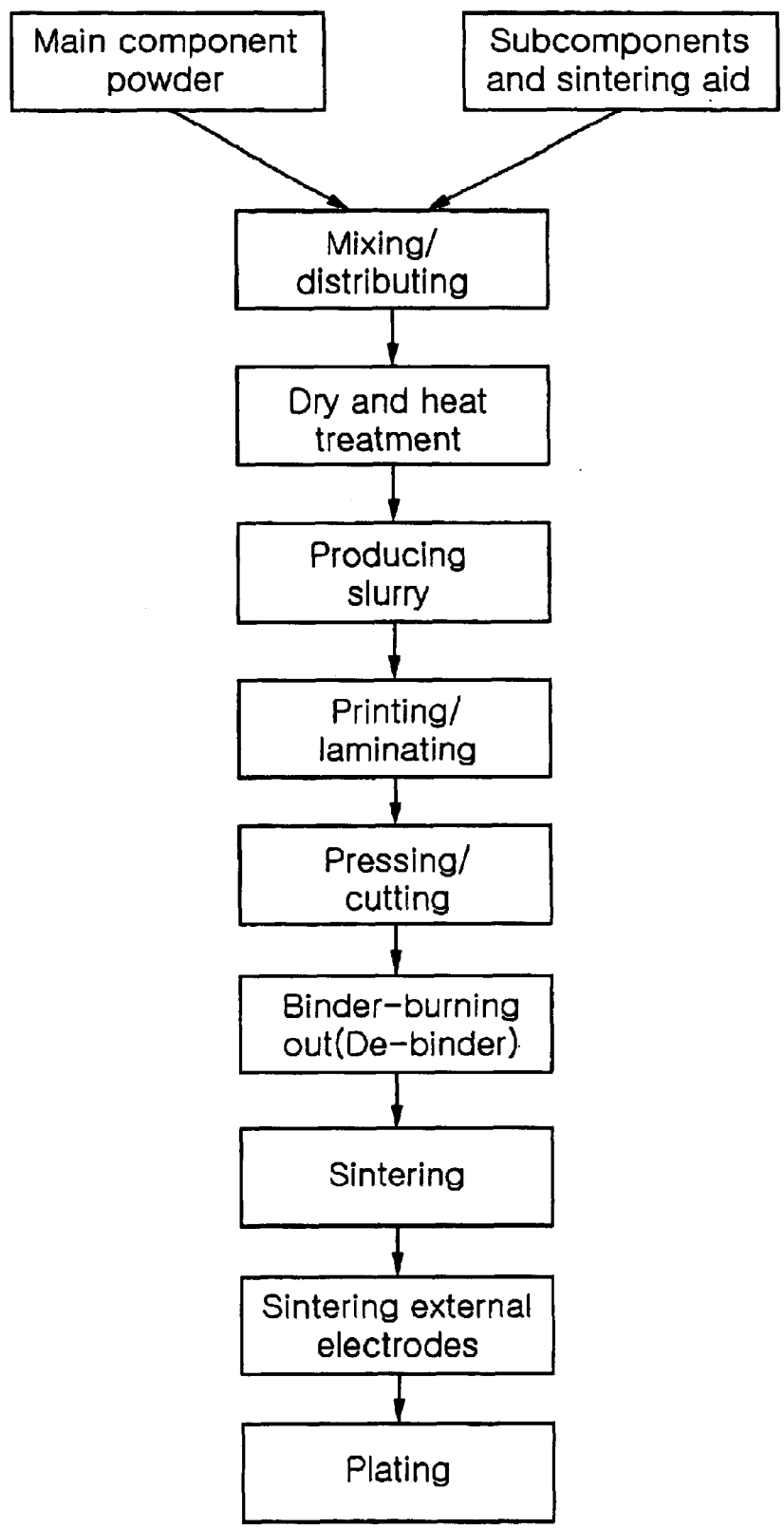
FIG. 2 is a flow diagram illustrating an example of a process of manufacturing a multi-layer ceramic capacitor according to the present invention.

An example of a method of manufacturing the multi-layer ceramic capacitor is illustrated in FIG. 2.

The present invention will now be described in detail with examples.

EXAMPLE 1

First, in order to obtain dielectric ceramic compositions having the ratios shown in Tables 1 and 2 as follows, a composite oxide (BCTZ or BCTS) comprising Ba, Ca, Ti, Zr and Sn as a starting material, and additives (subcomponents and sintering aid) serving to enhance electrical properties of the composition were individually weighed, wet-mixed and distributed. Next, after heat-treating the dried composition, an organic binder and a solvent were added to the composition to provide slurries.

The slurries were deposited on a 3 μm film through a sheet forming process to form sheets. After being printed with Ni internal electrodes, the sheets were laminated into 350 layers. The laminated sheets were pressed using a Cold Isostatic Press (CIP) at a temperature of 85° C. and under a pressure of 1,000 kg/cm$^2$ for 15 minutes and cut to provide samples. The samples were subjected to heat treatment to remove the organic binder, the distributing agent or the like at a temperature of 250~350° C. for 40 hours or more. The samples were sintered in a sintering furnace containing oxygen at a partial pressure of $10^{-11}$~$10^{-12}$ atm in a sintering atmosphere.

After sintering, Cu external electrodes were applied to the samples, and were sintered on the external electrodes at 850~920° C. After completion of sintering the external electrodes, plating was performed to the samples. The capacitor manufactured by the above process had dimensions of 2.0 mm×1.2 mm×1.25 mm and the dielectric ceramic layer had a thickness of 2 μm.

The plated samples were measured for their electric properties in a predetermined time.

The electric properties of the samples were measured using a Capacitance Meter (Agilent, 4278A) at a dielectric constant of 1 kHz and a dielectric loss of 1 Vrms. Further, the insulation resistance was measured using a High Resistance Meter (Agilent, 4339B) under a condition of 180 seconds at a rated voltage. A temperature dependency of the dielectric constant from −55~125° C. was measured using a TCC meter (4220A test chamber). The dielectric constant of the dielectrics was calculated using the thickness of the dielectric layer after sintering. With a high temperature load test, variation rate of insulation resistance with the passage of time was measured by applying a DC voltage of 18.9 V at 150° C. Further, an average life time of each sample was measured with the high temperature load test assuming that the sample had broken-down when the insulation resistance of the sample was $10^5$.

DC bias characteristics were represented in percentage as a ratio of the dielectric constant of the sample to which a DC voltage of 1 V is applied and the dielectric constant of the same sample to which the DC voltage is not applied.

An aging rate was represented in percentage as an electrostatic capacitance reduction rate, which is a reduction rate of the values obtained by dividing a primary capacitance of the sample with sectional capacitances. Here, the primary electrostatic capacitance was an electrostatic capacitance of the sample maintained at room temperature for 4 hours after being maintained at 150° C. for 2 hours. The sectional capacities are capacities of the sample maintained at room temperature after 10, 100 and 1,000 hours, respectively, after measuring the primary capacitance.

TABLE 1

| Type of main component | $(Ba_{1-x}Ca_x)_m(Ti_{1-y}N_y)O_3$ | | | | Particle size |
|---|---|---|---|---|---|
| | x | m | N | y | |
| A | 0.003 | 1.005 | Zr | 0.001 | 200 |
| B | 0.16 | 1.005 | Zr | 0.001 | 200 |
| C | 0.05 | 1.035 | Zr | 0.001 | 200 |
| D | 0.05 | 0.990 | Zr | 0.001 | 200 |
| E | 0.02 | 0.995 | Zr | 0.0001 | 200 |
| F | 0.02 | 0.995 | Zr | 0.007 | 200 |
| G | 0.04 | 1.005 | Zr | 0.001 | 200 |
| H | 0.04 | 1.005 | Sn | 0.001 | 200 |
| I | 0.04 | 1.005 | Zr | 0.001 | 40 |
| J | 0.04 | 1.005 | Zr | 0.001 | 500 |

In Table 1, Main components A and B comprise Ca, of which the content in $(Ba_{1-x}Ca_x)_m(Ti_{1-y}N_y)O_3$ is not in the range of the present invention. Main components C and D have the value of m different from that of the present invention. Main components G and H satisfy the condition of the present invention. Although Main components I and J have the content in the range of the present invention, they do not have the average particle size within the range of the present invention.

TABLE 2

| No. | Main Component | Subcomponents $bMgCO_3$-$cRe_2O_3$-$dMO$-$eMnO$-$fV_2O_5$ | | | | | $gSiO_2$ g | Sintering Temp. (° C.) | Dielectric constant | DF (%) | TCC (85° C.) (%) | IR ($10^8$ Ω) | Average life time (hr) | Remark |
|---|---|---|---|---|---|---|---|---|---|---|---|---|---|---|
| | | b | cRe | dM | e | f | | | | | | | | |
| 1 | A | 1.8 | 1.0Y | 1.0Ba | 0.1 | 0.02 | 1.5 | 1,170 | 3,000 | 5.5 | −10 | 5.5 | 10 | Reduction in average life time |
| 2 | B | 1.8 | 1.0Y | 1.0Ba | 0.1 | 0.02 | 1.5 | 1,170 | 2,000 | 9.0 | −8 | 0.1 | — | Minuteness |
| 3 | C | 1.8 | 1.0Y | 1.0Ba | 0.1 | 0.02 | 1.5 | 1,200 | 1,800 | 12 | −8 | 0.05 | — | Minuteness |
| 4 | D | 1.8 | 1.0Y | 1.0Ba | 0.1 | 0.02 | 1.5 | 1,200 | 2,900 | 6.5 | −11 | 0.01 | 2 | |
| 5 | E | 1.8 | 1.0Y | 1.0Ba | 0.1 | 0.02 | 1.5 | 1,250 | 3,000 | 6.9 | −15.9 | 8.9 | 20 | Deterioration in TCC High temperature sintering |
| 6 | F | 1.8 | 0.5Y | 1.0Ba | 0.1 | 0.02 | 1.5 | 1,170 | 4,000 | 9.9 | −2.0 | 5.6 | 40 | Deterioration in DC bias (−80% or more at 6.3 V) Deterioration in aging rate −6% |
| 7 | G | 1.8 | 1.0Y | 1.0Ba | 0.1 | 0 | 1.5 | 1,170 | 3,900 | 6.8 | −5.0 | 9.8 | 50 | |
| 8 | G | 1.8 | 1.0Y | 1.0Ba | 0.1 | 0.02 | 1.5 | 1,170 | 3,950 | 6.5 | −4.5 | 10.2 | 70 | Increase in average life time Aging rate −2% |
| 9 | G | 1.8 | 1.0Dy | 1.0Ba | 0.1 | 0.02 | 1.5 | 1,170 | 4,000 | 7.5 | −6.0 | 11.1 | 65 | |
| 10 | H | 1.8 | 1.0Dy | 1.0Ba | 0.1 | 0.02 | 1.5 | 1,170 | 3,850 | 5.6 | −6.6 | 9.6 | 60 | |
| 11 | G | 1.8 | 1.0Ho | 1.0Ba | 0.1 | 0.02 | 1.5 | 1,190 | 3,660 | 6.2 | −7.6 | 12.2 | 36 | |
| 12 | H | 1.8 | 1.0Ho | 1.0Ba | 0.1 | 0.02 | 1.5 | 1,190 | 3,580 | 8.2 | −5.8 | 13.5 | 34 | |
| 13 | G | 0.6 | 0.6Y | 0.5Ca | 0.1 | 0 | 1.5 | 1,170 | 4,100 | 7.9 | −3.1 | 12 | 48 | |
| 14 | G | 0.6 | 0.8Y | 0.6Ba | 0.2 | 0.01 | 1.3 | 1,170 | 3,800 | 8.5 | −4.6 | 14 | 58 | |
| 15 | G | 0.6 | 0.5Y | 0.6Ba | 0.2 | 0.01 | 1.3 | 1,170 | 4,410 | 9.8 | −2.9 | 15 | 51 | |
| 16 | I | 1.8 | 1.2Y | 1.0Ba | 0.1 | 0.02 | 1.5 | 1,170 | 2,100 | 15.2 | −5.2 | 1.2 | 0.1 | Non-controlled grain growth (Excessive grain growth) |
| 17 | J | 1.8 | 1.2Y | 1.0Ba | 0.1 | 0.02 | 1.5 | 1,170 | 4,540 | 5.6 | −18.2 | 2.6 | 0.5 | Reduction in average life time |
| 18 | G | 0.07 | 1.2Y | 2.0Ba | 0.2 | 0 | 1.5 | 1,170 | 3,900 | 12.1 | −18.1 | 0.8 | 8 | |
| 19 | G | 3.1 | 1.2Y | 1.0Ba | 0.1 | 0 | 1.5 | 1,170 | 2,500 | 8.6 | −12.3 | 0.8 | 4 | |
| 20 | G | 1.5 | 0.05Y | 2.0Ba | 0.1 | 0 | 1.5 | 1,170 | 4,020 | 9.2 | −1.8 | 5.6 | 1 | |
| 21 | G | 1.5 | 3.5Y | 1.0Ba | 0.1 | 0 | 2.0 | 1,250 | 3,100 | 5.2 | −3.2 | 10.5 | 5 | |
| 22 | G | 1.0 | 1.3Y | 0.03Ba | 0.2 | 0.01 | 1.5 | 1,170 | 3,500 | 20.1 | −6.7 | 2.1 | 2 | |

TABLE 2-continued

| No. | Main Com-ponent | Subcomponents bMgCO$_3$-cRe$_2$O$_3$-dMO-eMnO-fV$_2$O$_5$ | | | | | gSiO$_2$ | Sintering Temp. (° C.) | Dielectric constant | DF (%) | TCC (85° C.) (%) | IR (10$^8$ Ω) | Average life time (hr) | Remark |
|---|---|---|---|---|---|---|---|---|---|---|---|---|---|---|
| | | b | cRe | dM | e | f | g | | | | | | | |
| 23 | G | 1.0 | 1.3Y | 2.5Ba | 0.15 | 0.01 | 1.5 | 1,170 | 2,100 | 13.2 | −9.6 | 0.5 | 4 | |
| 24 | G | 1.0 | 1.3Y | 1.0Ba | 0.02 | 0 | 2.0 | 1,170 | 3,150 | 8.2 | −11.3 | 0.2 | 5 | |
| 25 | G | 1.0 | 1.3Y | 1.0Ba | 0.35 | 0 | 2.0 | 1,170 | 3,200 | 7.5 | −10.2 | 1.2 | 40 | Aging rate −2%/decade |
| 26 | G | 1.0 | 1.3Y | 1.0Ba | 0.1 | 0.15 | 2.0 | 1,170 | 3,400 | 8.6 | −10.5 | 0.4 | 11 | |
| 27 | G | 1.0 | 1.3Y | 1.0Ba | 0.1 | 0 | 0.1 | 1,170 | 2,100 | 9.8 | −5.3 | 0.1 | 5 | |
| 28 | G | 1.0 | 1.3Y | 1.0Ba | 0.1 | 0 | 3.5 | 1,170 | 2,500 | 11.2 | −6.9 | 0.2 | 10 | |
| 29 | H | 1.8 | 1.0Y | 1.0Ba | 0.1 | 0 | 1.5 | 1,170 | 3,810 | 7.8 | −5.2 | 9.1 | 45 | |
| 30 | H | 1.8 | 1.0Y | 1.0Ba | 0.1 | 0.02 | 1.5 | 1,170 | 3,890 | 7.5 | −4.1 | 9.8 | 56 | |
| 31 | H | 0.6 | 0.6Y | 0.5Ca | 0.1 | 0 | 1.5 | 1,170 | 3,850 | 5.6 | −6.6 | 8.6 | 45 | |
| 32 | H | 0.6 | 0.8Y | 0.6Ba | 0.2 | 0.01 | 1.3 | 1,190 | 3,655 | 6.5 | −7.9 | 12.2 | 51 | |
| 33 | H | 0.6 | 0.5Y | 0.6Ba | 0.2 | 0.01 | 1.3 | 1,190 | 3,980 | 9.1 | −4.6 | 10.1 | 34 | |

As shown in Table 2, in case of Sample 1~6, although the content of the additives is in the range of the present invention, the content of the main component $(Ba_{1-x}Ca_x)_m(Ti_{1-y}N_y)O_3$ is not in the range of the present invention.

Sample 1 has a Ca content lower than that of the present invention. There was provided a problem in that average life span was shortened.

Sample 2 has the content of Ca higher than that of the present invention. In case of Sample 2, since sintering did not occur at a sintering temperature of 1170° C., it exhibited a significantly low insulation resistance.

Sample 3 has a significantly high m value, compared with the present invention. Thus, in case of Sample 3, since sintering did not occur at a target sintering temperature, there was a problem of realizing a significantly low dielectric constant.

Sample 4 has a significantly low m value, compared with the present invention. Thus, in case of Sample 4, due to a deteriorated reduction resistance, there was a problem of decreased the insulation resistance.

Sample 5 has a lower content of $ZrO_2$ in the main component, compared with the present invention. Since Sample 5 had a slightly decreased dielectric constant and a decreased TCC of −15% or more at 85° C., it did not satisfy X5R characteristics.

Sample 6 has a significantly high content of $ZrO_2$ in the main component, compared with the present invention. Thus, there is a problem of large reduction in the dielectric constant according to an application of the DC bias.

Samples 7~15 satisfy the contents of the present invention.

When comparing Samples 7 and 8, addition of $V_2O_3$ led to an increase of 40% in the average life span.

In case of Samples 9~12, $Dy_2O_3$ and $Ho_2O_3$ were added, while in case of Samples 13~15, $Y_2O_3$ was added. When comparing these samples, it could be seen that addition of $Y_2O_3$ or $Dy_2O_3$ led to improvement in the dielectric constant and the average life span rather than addition of $Ho_2O_3$. When comparing Samples 14 and 15, it could be confirmed from Sample 14 that although addition of increased $Y_2O_3$ leads to an increased average life time, it causes reduction in the dielectric constant.

Although Samples 16 and 17 satisfy the contents of the present invention, they have an improper average particle size.

In case of Sample 16 of which the main component has a significantly small average particle size, since grain growth was not inhibited, the dielectric constant was decreased.

In case of Sample 17 of which the main component has a significantly large average particle size, since TCC at 85° C. is decreased to −15% or more, it did not satisfy X5R characteristics. Samples 18~28 comprise the main component in the range of the present invention. However, Samples 18~28 comprise the subcomponent and the sintering aid, which are not in the range of the present invention.

Samples 29~33 comprise the main component of $(Ba_{1-x}Ca_x)_m(Ti_{1-y}Sn_y)O_3$. It could be confirmed that addition of Sn to the main component ensured a high dielectric constant of 3,000 or more, and the samples satisfied the X5R characteristics.

EXAMPLE 2

At first, in order to obtain a dielectric ceramic composition having the ratio shown in Table 3, a composite oxide (BCT) comprising Ba, Ca and Ti as starting materials, and additives (subcomponents and sintering aid) having a purpose of enhancing properties of the composition were individually weighed, wet-mixed and distributed. Next, after heat-treating the dried composition, an organic binder and a solvent were added to the composition to provide ceramic slurries.

The slurries were deposited on a film of 3 μm through a sheet forming process to form sheets. After being printed with Ni internal electrodes, the sheets were laminated into 350 layers. The laminated sheets were pressed using the CIP at a temperature of 85° C. and a pressure of 1000 kg/cm$^2$ for 15 minutes and cut to provide samples. The samples were subjected to the heat treatment to remove the organic binder, the distributing agent or the like at a temperature of 250~350° C. for 40 hours or more, and sintered in the sintering furnace at a temperature of 1,130~1,170° C. The sintering furnace contains oxygen at a partial pressure of $10^{-11}$~$10^{-12}$ atm in the sintering atmosphere.

After sintering, the samples were applied with Cu external electrodes and sintered on the external electrodes at 850° C.~920° C. After completion of sintering on the external electrodes, plating of the samples was performed. The capacitor manufactured by the above process had dimensions of 2.0 mm×1.2 mm×1.25 mm and the dielectric ceramic layer had a thickness of 2 μm.

The plated samples were measured in their electric properties in a predetermined time.

The electric properties of the samples were measured using the same method as that of Example 1.

TABLE 3

| No. | Main Component $(Ba_{1-x}Ca_x)mTiO_3$ | Subcomponents $bMgCO_3$-$cRe_2O_3$-$dMo$-$eMnO$-$fV_2O_5$ | | | | | Sintering Temp. (°C) | Dielectric constant | DF (%) | TCC (85° C.) (%) | IR ($10^8$ Ω) | Average life time (hr) |
|---|---|---|---|---|---|---|---|---|---|---|---|---|
| | | b | cRe | dM | e | f | $h(BaO$—$ZrO_2$—$SiO_2)$ | | | | | |
| 34 | x = 0.04<br>m = 1.005 | 1.8 | 1.0Y | 1.0Ba | 0.1 | 0.02 | h = 2.0 mol<br>BaO = 0.15<br>$ZrO_2$ = 0.10<br>$SiO_2$ = 0.75 | 1,130<br>1,150 | 3,960<br>4,500 | 8.5<br>9.8 | −2.2<br>−0.1 | 11.0<br>13.0 | 75<br>75 |
| 35 | x = 0.04<br>m = 1.005 | 1.8 | 1.0Y | 1.0Ba | 0.1 | 0.02 | h = 0.2 mol<br>BaO = 0.35<br>$ZrO_2$ = 0.15<br>$SiO_2$ = 0.50 | 1,170 | 2,400 | 8.5 | — | 1.5 | 2 |
| 36 | x = 0.04<br>m = 1.005 | 1.8 | 1.0Y | 1.0Ba | 0.1 | 0.02 | h = 4.2 mol<br>BaO = 0.10<br>$ZrO_2$ = 0.15<br>$SiO_2$ = 0.75 | 1,170 | 3,200 | 18.2 | −2.0 | 1.2 | 1 |
| 37 | x = 0.04<br>m = 1.005 | 1.8 | 0.5Y | 1.0Ba | 0.1 | 0.02 | h = 0 mol<br>BaO = 0<br>$ZrO_2$ = 0<br>$SiO_2$ = 1.5 | 1,170 | 4,210 | 8.6 | −3.0 | 15.6 | 52 |
| 38 | x = 0.04<br>m = 1.005 | 1.8 | 0.5Y | 1.0Ba | 0.1 | 0.02 | h = 2.0 mol<br>BaO = 0.10<br>$ZrO_2$ = 0.15<br>$SiO_2$ = 0.75 | 1,130 | 4,760 | 9.4 | −0.6 | 16.2 | 53 |

In Table 3, Sample 37 comprises the main component of $(Ba_{1-x}Ca_x)_mTiO_3$ and the sintering aid of $SiO_2$. Samples 34~36 and 38 comprise the main component of $(Ba_{1-x}Ca_x)_mTiO_3$ and the sintering aid $BaO$—$ZrO_2$—$SiO_2$.

When the sintering aid of $BaO$—$ZrO_2$—$SiO_2$ is added, not only is a sintering temperature lowered by 30~50° C., but also both dielectric constant and TCC are enhanced.

As described above, in accordance with the present invention, there are provided a high electrostatic capacitance dielectric ceramic composition, which can be sintered along with base metal electrodes at a low temperature under a reducing atmosphere and can be made into super thin layers, each of which has a thickness of 3 μm or less, and the multi-layer ceramic capacitor using the same.

It should be understood that the embodiments and the accompanying drawings as described above have been described for illustrative purposes and the present invention is limited by the following claims. For example, although the present invention is set forth with reference to an example of the multi-layer ceramic capacitor, the dielectric ceramic composition can be also applied to a general ceramic capacitor. Further, those skilled in the art will appreciate that various modifications, additions and substitutions are allowed without departing from the scope and spirit of the invention as set forth in the accompanying claims.

What is claimed is:

1. A non reducible dielectric ceramic composition, comprising:

a main component of $(Ba_{1-x}Ca_x)_m(Ti_{1-y}Zr_y)O_3$;

subcomponents of MgO, $Re_2O_3$, MO, MnO and $V_2O_5$ where Re is one or more elements selected from the group of Y, Dy and Ho and M is one or two elements selected from the group of Ba and Ca; and a sintering aid of $SiO_2$, wherein when the composition is represented by the formula $100(Ba_{1-x}Ca_x)_m(Ti_{1-y}Zr_y)O_3+bMgO+cRe_2O_3+dMO+eMnO+fV_2O_5+gSiO_2$, the ratio of the components satisfies the conditions of $0.005≦x≦0.15$, $0.995≦m≦1.03$, $0.0005≦y≦0.005$, $0.1≦b≦3.0$, $0.1≦c≦3.0$, $0.05≦d≦2.0$, $0.05≦e≦0.3$, $0.0≦f≦0.1$, and $0.2≦g≦3.0$ based on the molar ratio.

2. A non reducible dielectric ceramic composition, comprising:

a main component of $(Ba_{1-x}Ca_x)_m(Ti_{1-y}Sn_y)O_3$;

subcomponents of MgO, $Re_2O_3$, MO, MnO and $V_2O_5$ where Re is one or more elements selected from the group of Y, Dy and Ho and M is one or two elements selected from the group of Ba and Ca; and a sintering aid of $SiO_2$, wherein when the composition is represented by the formula $100(Ba_{1-x}Ca_x)_m(Ti_{1-y}Sn_y)O_3+bMgO+cRe_2O_3+dMO+eMnO+fV_2O_5+gSiO_2$, the ratio of the components satisfies the conditions of $0.005≦x≦0.15$, $0.995≦m≦1.03$, $0.0005≦y≦0.005$, $0.1≦b≦3.0$, $0.1≦c≦3.0$, $0.05≦d≦2.0$, $0.05≦e≦0.3$, $0.0≦f≦0.1$, and $0.2≦g≦3.0$ based on the molar ratio.

3. A non reducible dielectric ceramic composition, comprising:

a main component of $(Ba_{1-x}Ca_x)_mTiO_3$;

subcomponents of MgO, $Re_2O_3$, MO, MnO and $V_2O_5$ where Re is one or more elements selected from the group of Y, Dy and Ho and M is one or two elements selected from the group of Ba and Ca; and a sintering aid of $(BaO$—$ZrO_2$—$SiO_2)$, wherein when the composition is represented by the formula $100(Ba_{1-x}Ca_x)_mTiO_3+bMgO+cRe_2O_3+dMO+eMnO+fV_2O_5+h(BaO$—$ZrO_2$—$SiO_2)$, the ratio of the components satisfies the conditions of $0.005≦x≦0.15$, $0.995≦m≦1.03$, $0.1≦b≦3.0$, $0.1≦c≦3.0$, $0.05≦d≦2.0$, $0.05≦e≦0.3$, $0.0≦f≦0.1$, and $0.3≦h≦4.1$ based on the molar ratio.

4. The dielectric ceramic composition as set forth in any one of claim 1, wherein the main component has an average particle size of 50~400 nm.

5. The dielectric ceramic composition as set forth in any one of claim 2, wherein the main component has an average particle size of 50~400 nm.

6. The dielectric ceramic composition as set forth in any one of claim 3, wherein the main component has an average particle size of 50~400 nm.

7. The dielectric ceramic composition as set forth in any one of claim 1, wherein a sum of m and d is 1.00~1.03.

8. The dielectric ceramic composition as set forth in any one of claim 2, wherein a sum of m and d is 1.00~1.03.

9. The dielectric ceramic composition as set forth in any one of claim 3, wherein a sum of m and d is 1.00~1.03.

10. The dielectric ceramic composition as set forth in claim 3, wherein the sintering aid of $BaO$—$ZrO_2$—$SiO_2$ comprises 5~15 mol % of $ZrO_2$, 50~75 mol % of $SiO_2$ and the remainder of BaO.

11. A super thin multi-layer ceramic capacitor comprising:
a plurality of dielectric ceramic layers,
internal electrodes formed between the dielectric ceramic layers; and
external electrodes electrically connected to the internal electrodes,
each of the dielectric ceramic layers comprising:
a main component of $(Ba_{1-x}Ca_x)_m(Ti_{1-y}Zr_y)O_3$;
subcomponents of MgO, $Re_2O_3$, MO, MnO and $V_2O_5$ where Re is one or more elements selected from the group of Y, Dy and Ho and M is one or two elements selected from the group of Ba and Ca; and
a sintering aid of $SiO_2$,
wherein when the composition is represented by the formula $100(Ba_{1-x}Ca_x)_m(Ti_{1-y}Zr_y)O_3 + bMgO + cRe_2O_3 + dMO + eMnO + fV_2O_5 + gSiO_2$, the ratio of the components satisfies the conditions of $0.005 \leq x \leq 0.15$, $0.995 \leq m \leq 1.03$, $0.0005 \leq y \leq 0.005$, $0.1 \leq b \leq 3.0$, $0.1 \leq c \leq 3.0$, $0.05 \leq d \leq 2.0$, $0.05 \leq e \leq 0.3$, $0.0 \leq f \leq 0.1$, and $0.2 \leq g \leq 3.0$ based on the molar ratio.

12. A super thin multi-layer ceramic capacitor comprising:
a plurality of dielectric ceramic layers;
internal electrodes formed between the dielectric ceramic layers; and
external electrodes electrically connected to the internal electrodes,
each of the dielectric ceramic layers comprising:
a main component of $(Ba_{1-x}Ca_x)_m(Ti_{1-y}Sn_y)O_3$;
subcomponents of MgO, $Re_2O_3$, MO, MnO and $V_2O_5$ where Re is one or more elements selected from the group of Y, Dy and Ho and M is one or two elements selected from the group of Ba and Ca; and
a sintering aid of $SiO_2$,
wherein when the composition is represented by the formula $100(Ba_{1-x}Ca_x)_m(Ti_{1-y}Sn_y)O_3 + bMgO + cRe_2O_3 + dMO + eMnO + fV_2O_5 + gSiO_2$, the ratio of the components satisfies the conditions of $0.005 \leq x \leq 0.15$, $0.995 \leq m \leq 1.03$, $0.0005 \leq y \leq 0.005$, $0.1 \leq b \leq 3.0$, $0.1 \leq c \leq 3.0$, $0.05 \leq d \leq 2.0$, $0.05 \leq e \leq 0.3$, $0.0 \leq f \leq 0.1$, and $0.2 \leq g \leq 3.0$ based on the molar ratio.

13. A super thin multi-layer ceramic capacitor, comprising:
a plurality of dielectric ceramic layers;
internal electrodes formed between the dielectric ceramic layers; and
external electrodes electrically connected to the internal electrodes,
each of the dielectric ceramic layers comprising:
a main component of $(Ba_{1-x}Ca_x)_mTiO_3$;
subcomponents of MgO, $Re_2O_3$, MO, MnO and $V_2O_5$ where Re is one or more elements selected from the group of Y, Dy and Ho and M is one or two elements selected from the group of Ba and Ca; and
a sintering aid of $(BaO$—$ZrO_2$—$SiO_2)$,
wherein when the composition is represented by the formula $100(Ba_{1-x}Ca_x)_mTiO_3 + bMgO + cRe_2O_3 + dMO + eMnO + fV_2O_5 + h(BaO$—$ZrO_2$—$SiO_2)$, the ratio of the components satisfies the conditions of $0.005 \leq x \leq 0.15$, $0.995 \leq m \leq 1.03$, $0.1 \leq b \leq 3.0$, $0.1 \leq c \leq 3.0$, $0.05 \leq d \leq 2.0$, $0.05 \leq e \leq 0.3$, $0.0 \leq f \leq 0.1$, and $0.3 \leq h \leq 4.1$ based on the molar ratio.

14. The super thin multi-layer ceramic capacitor as set forth in any one of claim 11, wherein the main component has an average particle size of 50~400 nm.

15. The super thin multi-layer ceramic capacitor as set forth in any one of claim 12, wherein the main component has an average particle size of 50~400 nm.

16. The super thin multi-layer ceramic capacitor as set forth in any one of claim 13, wherein the main component has an average particle size of 50~400 nm.

17. The super thin multi-layer ceramic capacitor as set forth in any one of claim 11, wherein a sum of m and d is 1.00~1.03.

18. The super thin multi-layer ceramic capacitor as set forth in any one of claim 12, wherein a sum of m and d is 1.00~1.03.

19. The super thin multi-layer ceramic capacitor as set forth in any one of claim 13, wherein a sum of m and d is 1.00~1.03.

20. The super thin multi-layer ceramic capacitor as set forth in any one of claim 11, wherein each of the dielectric layers has a thickness of 0.5~3 µm and a dielectric constant of 3,500 or more.

21. The super thin multi-layer ceramic capacitor as set forth in any one of claim 12, wherein each of the dielectric layers has a thickness of 0.5~3 µm and a dielectric constant of 3,500 or more.

22. The super thin multi-layer ceramic capacitor as set forth in any one of claim 13, wherein each of the dielectric layers has a thickness of 0.5~3 µm and a dielectric constant of 3,500 or more.

23. The super thin multi-layer, ceramic capacitor as set forth in claim 13, wherein the sintering aid of $BaO$—$ZrO_2$—$SiO_2$ comprises 5~15 mol % of $ZrO_2$, 50~75 mol % of $SiO_2$ and the remainder of BaO.

* * * * *